United States Patent
Kleindl et al.

(10) Patent No.: US 9,551,310 B2
(45) Date of Patent: Jan. 24, 2017

(54) VALVE DEVICE

(71) Applicant: Robert Bosch GmbH, Stuttgart (DE)

(72) Inventors: Michael Kleindl, Schwieberdingen (DE); Tamim Latif, Tokyo (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/443,756

(22) PCT Filed: Oct. 7, 2013

(86) PCT No.: PCT/EP2013/070768
§ 371 (c)(1),
(2) Date: May 19, 2015

(87) PCT Pub. No.: WO2014/079624
PCT Pub. Date: May 30, 2014

(65) Prior Publication Data
US 2015/0292457 A1    Oct. 15, 2015

(30) Foreign Application Priority Data
Nov. 26, 2012    (DE) .......................... 10 2012 221 543

(51) Int. Cl.
*F02M 51/06*    (2006.01)
*F02M 61/12*    (2006.01)
(Continued)

(52) U.S. Cl.
CPC ....... *F02M 51/0625* (2013.01); *F02M 59/367* (2013.01); *F02M 59/462* (2013.01);
(Continued)

(58) Field of Classification Search
CPC  F02M 2200/16; F02M 15/0675; F02M 61/12; F02M 51/0625; F16K 31/0648; F16K 31/0686
(Continued)

(56) References Cited

U.S. PATENT DOCUMENTS

| 5,110,053 A | * | 5/1992 | Stevens | ................. F02M 45/12 239/533.11 |
| 8,371,516 B2 | * | 2/2013 | Eisenmenger | ....... F02M 47/027 239/533.2 |

(Continued)

FOREIGN PATENT DOCUMENTS

| CH | 218190 | 3/1942 |
| DE | 10 2005 061 886 A1 | 7/2007 |

(Continued)

OTHER PUBLICATIONS

International Search Report corresponding to PCT Application No. PCT/EP2013/070768, mailed Jan. 23, 2014 (German and English language document) (5 pages).

*Primary Examiner* — Hai Huynh
*Assistant Examiner* — Raza Najmuddin
(74) *Attorney, Agent, or Firm* — Maginot, Moore & Beck LLP

(57) ABSTRACT

A valve device includes a housing, a flow duct and a valve body. The valve body is arranged in the flow duct and bears with a sealing section against a housing-side sealing seat when the valve device is closed. The valve body is guided along a movement axis by a housing-side guide surface and bears with a stop surface against a housing-side movement limiting surface when the valve device is open to the maximum. The guide surface is provided by a guide element, and the sealing seat and the movement limiting surface are provided separately by the guide element.

10 Claims, 2 Drawing Sheets

(51) Int. Cl.
  *F02M 59/36* (2006.01)
  *F02M 63/00* (2006.01)
  *F02M 59/46* (2006.01)
  *F16K 31/06* (2006.01)

(52) U.S. Cl.
  CPC ...... *F02M 63/005* (2013.01); *F02M 63/0035* (2013.01); *F16K 31/0648* (2013.01); *F16K 31/0686* (2013.01)

(58) Field of Classification Search
  USPC ............................... 123/459, 446, 457, 458
  See application file for complete search history.

(56) References Cited

U.S. PATENT DOCUMENTS

| | | | | |
|---|---|---|---|---|
| 8,662,411 | B2 * | 3/2014 | Gruenberger | ............... 239/533.2 |
| 2009/0308354 | A1 * | 12/2009 | Eisenmenger | ....... F02M 47/027 |
| | | | | 123/476 |
| 2011/0042491 | A1 * | 2/2011 | Abe | .................... F02M 61/188 |
| | | | | 239/584 |

FOREIGN PATENT DOCUMENTS

| | | |
|---|---|---|
| EP | 2 302 195 A1 | 3/2011 |
| EP | 2 388 470 A1 | 11/2011 |
| GB | 727774 | 4/1955 |
| JP | 2-120560 U | 9/1990 |
| JP | 7-293720 A | 11/1995 |
| JP | 3-236088 A | 9/1997 |
| JP | 2005-221043 A | 8/2005 |
| JP | 2009-520908 A | 5/2009 |

* cited by examiner

VALVE DEVICE

This application is a 35 U.S.C. §371 National Stage application of PCT/EP2013/070768, filed on Oct. 7, 2013, which claims the benefit of priority to Ser. No. DE 10 2012 221 543.3, filed on Nov. 26, 2012, in Germany, the disclosures of which are incorporated herein by reference in their entirety.

BACKGROUND

The disclosure relates to a valve device in accordance with the following description and to a high pressure pump as described below.

Valve devices, for example outlet valves of a high pressure pump of a fuel system of an internal combustion engine, are known on the marketplace. Frequently, valve devices of this type have a valve body which can bear on a sealing section against a housing-side sealing seat and thus close the valve device.

EP 2 388 470 A1 and EP 2 302 195 A1 have disclosed valve devices which have guide faces for guiding the valve body along a movement axis and movement limiting faces for limiting an opening travel of the valve body.

The present disclosure is based on the object of specifying a valve device which can be produced as economically as possible.

SUMMARY

The problem on which the disclosure is based is solved by way of a valve device as described in the following description and by way of a high pressure pump as described below. Advantageous developments are specified in the following description. Features which are important for the disclosure are found, furthermore, in the following description and in the drawing, it being possible for the features to be important for the disclosure both on their own and in different combinations, without reference being made explicitly to this again.

In the valve device according to the disclosure, a guide element is provided which serves exclusively to guide the valve body. The sealing seat and the movement limiting face are provided separately from the guide element, with the result that the guide element can be configured exclusively with regard to its function for guiding the valve body. This makes a production of the guide element and the valve device possible, which production is particularly economical and insensitive to tolerances.

By virtue of the fact that the sealing seat and the movement limiting face are provided separately from the guide element, the same guide element can be used for valve devices with sealing seats and/or movement limiting faces of different design. The guide element is therefore particularly satisfactorily suitable for mass production. At the same time, the properties of the valve device can be influenced inexpensively, for example by way of a selection of a defined sealing seat geometry and/or by way of a selection of the position of the movement limiting face, which makes a setting of the stroke, that is to say of the movement travel of the valve body along the movement axis, possible.

By virtue of the fact that the guide element is provided separately, a solution is produced which is particularly easy to assemble. The exclusion of further functions makes a reduction in tolerance influences possible, moreover. Overall, a valve device can be provided which can be produced particularly economically.

The valve device according to the disclosure is, in particular, a check valve.

In one embodiment of the disclosure, the guide element is manufactured in the form of a stamped part. This makes manufacturing of the guide element possible which is reproducibly accurate and at the same time economical.

For further improvement of the ability to manufacture the valve device, it is proposed that the guide element and the housing are connected to one another by means of a non-positive and/or positively locking connection, in particular dispensing with an integrally joined connection. In this way, the guide element and the housing can be joined to one another in a simple way, for example can be pressed to one another.

It is provided according to one embodiment of the disclosure that the valve body is manufactured in the form of a deep drawn part. This makes economical manufacturing of a sealing section possible and makes it possible, in particular, to provide a substantially cup-shaped valve body section, in which at least sections of a valve spring can be received.

It is possible that the sealing seat is configured in one piece with the housing. It is preferred, however, if the sealing seat is provided by a sealing seat element which is separate from the housing. This makes it possible to use different sealing seat elements while using identical housings and makes it possible for said sealing seat elements to be optimized with regard to a desired sealing geometry.

In order to simplify the assembly of the sealing seat element, it is proposed that the sealing seat element and the housing are connected to one another by means of a non-positive and/or positively locking connection, in particular dispensing with an integrally joined connection. For example, the sealing seat element and the housing are connected to one another by means of a press fit.

It is possible that the movement limiting face is configured in one piece with the housing. It is preferred, however, that the movement limiting face is provided by a movement limiting element which is separate from the housing. This simplifies the assembly of the valve device. Furthermore, if the same housing and movement limiting elements with different dimensions are used, the position of the movement limiting face and therefore a maximum movement travel of the valve body can be set in a simple way.

According to one preferred embodiment, the movement limiting element is manufactured in the form of a stamped part, as a result of which a reproducibly accurate geometry of the movement limiting element can be provided inexpensively.

It is preferred that the movement limiting element and the housing are connected to one another by means of a non-positive and/or positively locking connection, in particular dispensing with an integrally joined connection. This makes a simplification of the assembly possible by means of a simple joining operation of the movement limiting element and the housing.

BRIEF DESCRIPTION OF THE DRAWINGS

In the following text, exemplary embodiments of the disclosure will be explained with reference to the drawing, in which.

DETAILED DESCRIPTION

Figure 1:
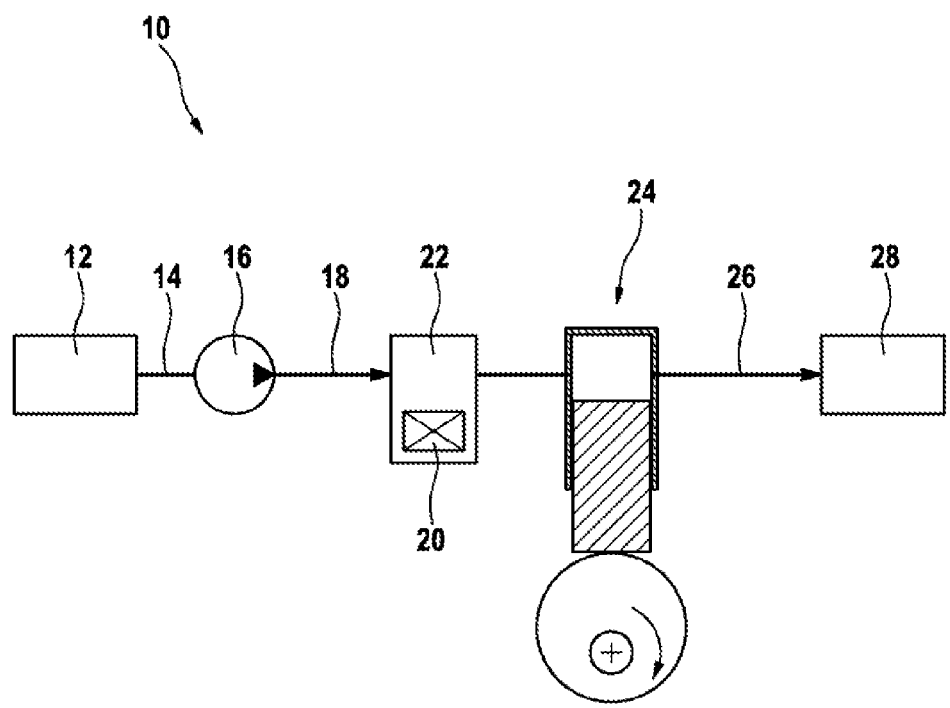
FIG. 1 shows a simplified diagram of a fuel system with a high pressure pump and a valve device.

FIG. 1 shows a fuel system 10 of an internal combustion engine in a greatly simplified illustration. Fuel is fed from a fuel tank 12 via a suction line 14, by means of a prefeed pump 16, via a low pressure line 18, and via an inlet valve 20 to a delivery space 23 of a high pressure pump 24.

The inlet valve 20 is, for example, a quantity control valve and can be actuated by an electromagnet. As an alternative to an electromagnet, a piezoelectric actuator or hydraulic actuator can also be used, for example.

The high pressure pump 24 has an outlet valve which is configured in the form of a valve device 22 which will be described in greater detail in the following text. The valve device 22 communicates via a high pressure line 26 to a high pressure accumulator 28.

During operation of the fuel system 10, the prefeed pump 16 delivers fuel from the fuel tank 12 into the low pressure line 18. Here, the inlet valve 20 determines the fuel quantity which is fed to the delivery space 23 of the high pressure pump 24.

The function of the valve device 22 consists in opening in a delivery phase of the high pressure pump 24, in order to produce a fluid connection between the delivery space 23 and the high pressure accumulator 28, in order that the high pressure accumulator 28 can be filled with pressurized fluid. In a suction phase of the high pressure pump 24, the valve device 22 closes, in order to prevent an undesired backflow of fluid out of the high pressure accumulator 28 into the delivery space 23.

Figure 2:
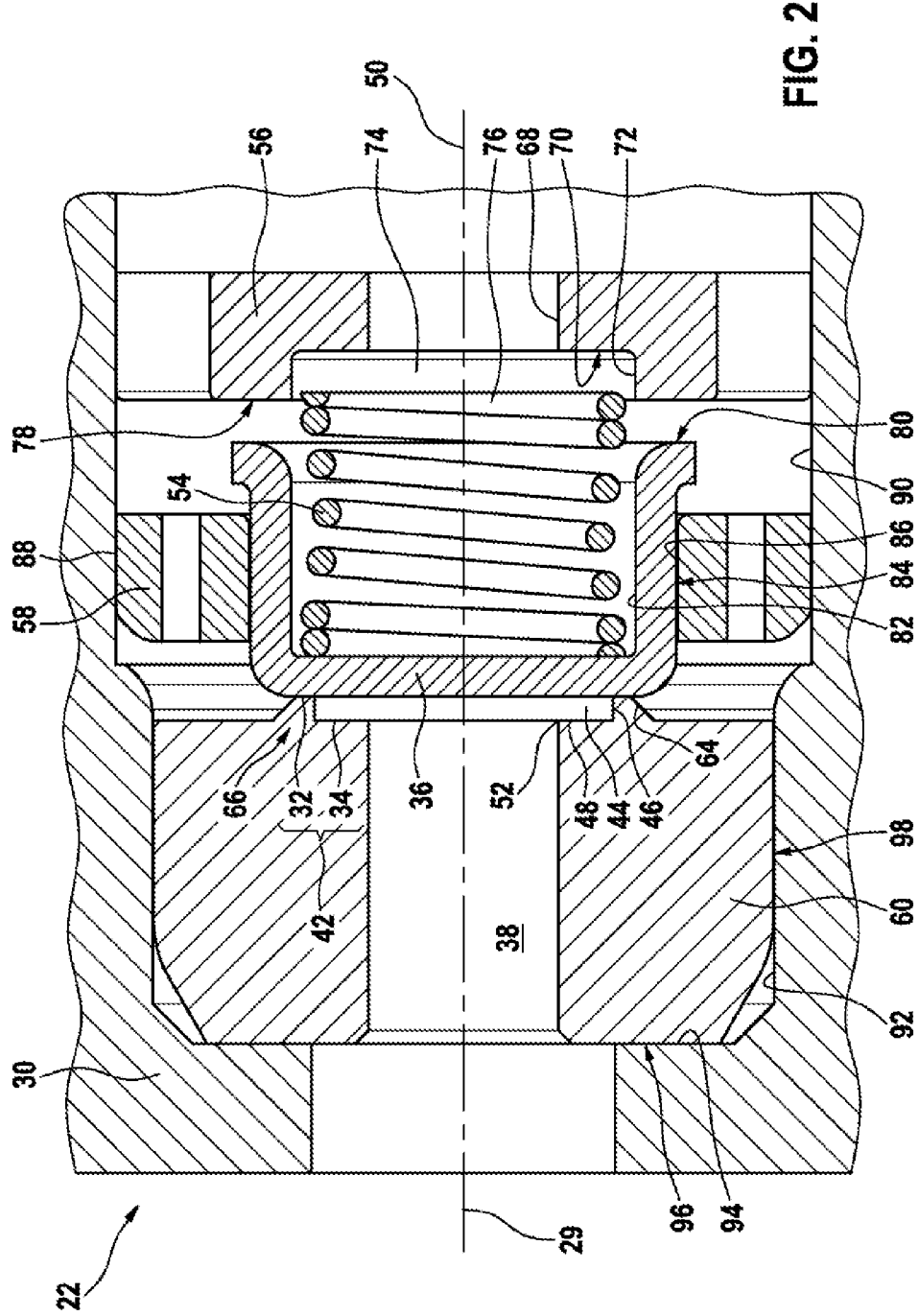
FIG. 2 shows a simplified sectional illustration of one embodiment of the valve device according to FIG. 1.

FIG. 2 shows one embodiment of the valve device 22 according to FIG. 1 in a simplified sectional illustration. The elements of the valve device 22 which are shown in the drawing are configured substantially rotationally symmetrically about a longitudinal axis 29 and comprise a housing 30 with a sealing seat 32, against which a sealing section 34 of a valve body 36 bears when the valve device 22 is closed.

Upstream of the sealing seat 32, the valve device 22 has a flow duct 38 which extends parallel to the longitudinal axis 29.

The sealing seat 32 and the sealing section 34 are configured flatly and parallel to one another and together form a sealing region 42.

A decaying space 44 is optionally formed upstream of the sealing region 42 and downstream of the flow duct 38 by means of a step-like recess in the housing 30, which decaying space 44 is delimited by a deflector wall 46 which extends at a right angle from the sealing region 42 or its plane and by a boundary wall 48. The decaying space 44 serves to protect the sealing seat 32 and the sealing section 34 against cavitation erosion.

The boundary wall 48 extends perpendicularly with respect to a movement axis 50, along which the valve body 36 can be moved for opening and closing the valve device 22. The movement axis 50 and the longitudinal axis 29 are preferably parallel to one another and, in particular, identical to one another.

A fluid, in particular fuel, first of all flows within the flow duct 38 substantially parallel to the longitudinal axis 29 and is then deflected radially to the outside upstream of the valve body 36. The deflection of the flow takes place comparatively prematurely and with low loss by means of the hydraulic action of the decaying space 44 downstream of an edge 52 which delimits the flow duct 38 on the end side.

Moreover, the valve device 22 comprises a valve spring 54 which loads the valve body 36 with a closing force. The valve spring 54 is supported on a movement limiting element 56. The movement limiting element 56 can be formed by the housing 30. It is preferred, however, that the movement limiting element 56 is provided separately from the housing 30.

In order to guide the valve body 36 along the movement axis 50, a guide element 58 which is provided separately from the housing 30 is provided.

The sealing seat 32 can be formed by the housing 30. It is preferred, however, that the sealing seat 32 is formed by a sealing seat element 60 which is provided separately from the housing 30.

In an open state of the valve device 22, fluid, in particular fuel, flows in the sealing region 42 in a fluid flow direction. The sealing seat 32 is adjoined by a flow guiding face 64 on that side of the sealing seat 32 which faces away from the deflector wall 46.

The deflector wall 46, the sealing seat 32 and the flow guiding face 64 together form a housing-side projection 66.

The movement limiting element 56 is manufactured in the form of a stamped part and has a central opening 68 which extends along the longitudinal axis 29. It is preferred that the opening 68 has the same diameter as the flow duct 38 of the sealing seat element 60.

The movement limiting element 56 has a spring supporting face 70 which, together with a spring guiding face 72, delimits a spring receiving region 74.

The valve spring 54 is supported with a spring end 76 which faces away from the sealing region 42 on the spring supporting face 70. In the drawing, the spring end 76 and the spring supporting face 70 are shown spaced apart from one another in order to improve the clarity. The movement limiting element 56 has a movement limiting face 78 which faces the valve body 36 and preferably extends in a plane which is perpendicular with respect to the movement axis 50 of the valve body 36.

The valve body 36 is configured in the form of a cup-shaped deep drawn part and, on its side which faces away from the sealing section 34, has an, in particular, annular stop face 80 which bears against the movement limiting face 78 of the movement limiting element 56 in a maximum open position of the valve body 36.

The valve body 36 has a substantially cylindrical interior 82 for receiving the valve spring 54. Furthermore, the valve body 36 has a cylindrical outer face 84 which is received with play in a hollow-cylindrical guide face 86 of the guide element 58.

The guide element 58 has a radially outwardly pointing cylindrical outer face 88 which is received by means of a press fit in a hollow-cylindrical housing opening 90 of the housing 30.

The housing opening 90 narrows in a region 92 at the level of the sealing seat element 60. The region 92 adjoins a bearing face 94 which extends perpendicularly with respect to the longitudinal axis 29 and against which the sealing seat element 60 bears with an end face 96. Furthermore, the sealing seat element 60 has a cylindrical outer face 98 which is pressed with the housing 30 in the region 92 of said housing 30.

The functions "sealing", "guiding" and "limiting movement travel" are provided with the aid of the components which are separate from one another in the form of the sealing seat element 60, the guide element 58 and the movement limiting element 56. In particular, the guide element 58 has exclusively a guide function and no seal function and no travel limiting function. The sealing seat element 60 has exclusively a sealing function and no guide function and no travel limiting function. The movement limiting element 56 has exclusively the function of limiting the movement travel of the valve body 36 in the opening direction and does not have any guide function or any seal function.

The invention claimed is:

1. A valve device, comprising:
   a housing;
   a flow duct arranged in the housing, the flow duct configured to guide a flow of fluid along a flow path through the housing;
   a valve body arranged in the flow path; and
   a guide element arranged in the flow path, the guide element defining (i) a housing-side guide face configured to guide the valve body along a movement axis and (ii) at least one flow aperture configured to permit the fluid to flow through the guide element,
   wherein the valve body has (i) a sealing section configured to bear against a housing-side sealing seat when the valve device is closed and (ii)
   a stop face configured to bear against a housing-side movement limiting face when the valve device is open to its maximum,
   wherein the housing-side sealing seat and the housing-side movement limiting face are not defined by the guide element, and
   wherein the guide element and the housing are connected to one another by at least one of a non-positive and a positively locking connection.

2. The valve device as claimed in claim 1, wherein the guide element is a stamped part.

3. The valve device as claimed in claim 1, wherein the valve body is a deep drawn part.

4. The valve device as claimed in claim 1, wherein the housing-side sealing seat is defined by a sealing seat element that is separate from the housing.

5. The valve device as claimed in claim 4, wherein the sealing seat element and the housing are connected to one another by at least one of a non-positive and a positively locking connection.

6. The valve device as claimed in claim 1, wherein the housing-side movement limiting face is defined by a movement limiting element that is separate from the housing.

7. The valve device as claimed in claim 6, wherein the movement limiting element is a stamped part.

8. The valve device as claimed in claim 6, wherein the movement limiting element and the housing are connected to one another by at least one of a non-positive and a positively locking connection.

9. A high pressure pump of a fuel system of an internal combustion engine, comprising:
   an outlet valve configured to discharge fuel from a delivery space of the high pressure pump, the outlet valve configured as a valve device, including:
   a housing;
   a flow duct arranged in the housing, the flow duct configured to guide a flow of fluid along a flow path through the housing;
   a valve body arranged in the flow path; and
   a guide element arranged in the flow path, the guide element defining (i) a housing-side guide face configured to guide the valve body along a movement axis and (ii) at least one flow aperture configured to permit the fluid to flow through the guide element,
   wherein the valve body is has (i) a sealing section configured to bear against a housing-side sealing seat when the valve device is closed and (ii)
   a stop face configured to bear against a housing-side movement limiting face when the valve device is open to its maximum,
   wherein the housing-side sealing seat and the housing-side movement limiting face are not defined by the guide element, and
   wherein the guide element and the housing are connected to one another by at least one of a non-positive and a positively locking connection.

10. The valve device as claimed in claim 1, wherein the at least one flow aperture faces in a direction parallel to the movement axis of the valve body.

* * * * *

UNITED STATES PATENT AND TRADEMARK OFFICE
CERTIFICATE OF CORRECTION

| | | |
|---|---|---|
| PATENT NO. | : 9,551,310 B2 | Page 1 of 1 |
| APPLICATION NO. | : 14/443756 | |
| DATED | : January 24, 2017 | |
| INVENTOR(S) | : Kleindl et al. | |

It is certified that error appears in the above-identified patent and that said Letters Patent is hereby corrected as shown below:

On the Title Page

On page 2, the "FOREIGN PATENT DOCUMENTS" section should read:
FOREIGN PATENT DOCUMENTS

| | | | |
|---|---|---|---|
| EP | 2 302 195 | A1 | 3/2011 |
| EP | 2 388 470 | A1 | 11/2011 |
| GB | 727774 | | 4/1955 |
| JP | 2-120560 | U | 9/1990 |
| JP | 7-293720 | A | 11/1995 |
| JP | 9-236088 | A | 9/1997 |
| JP | 2005-221043 | A | 8/2005 |
| JP | 2009-520908 | A | 5/2009 |

In the Claims

In Column 6, Lines 22-24, Lines 16-18 of claim 9 should read:
wherein the valve body has (i) a sealing section
    configured to bear against a housing-side sealing seat
    when the valve device is closed and (ii)

Signed and Sealed this
Sixth Day of June, 2017

Michelle K. Lee
*Director of the United States Patent and Trademark Office*